United States Patent [19]

Mizuide

[11] Patent Number: 4,506,170
[45] Date of Patent: Mar. 19, 1985

[54] DIFFERENTIAL CURRENT DISTRIBUTING CIRCUIT

[75] Inventor: Yasuo Mizuide, Kawasaki, Japan

[73] Assignee: Tokyo Shibaura Denki Kabushiki Kaisha, Japan

[21] Appl. No.: 465,035

[22] Filed: Feb. 8, 1983

[30] Foreign Application Priority Data

Feb. 12, 1982 [JP] Japan ................ 57-20817

[51] Int. Cl.³ .............. H03K 17/04; H03K 5/24; H03K 3/26
[52] U.S. Cl. .................. 307/355; 307/244; 307/263; 307/291
[58] Field of Search ........... 307/255, 355, 263, 291, 307/244, 262, 354

[56] References Cited

U.S. PATENT DOCUMENTS 3,848,139  11/1974  Holt, Jr. ............... 307/355
3,938,014   2/1976  Nakajima ............... 318/138
4,276,485   6/1981  Rydval ................. 307/291

FOREIGN PATENT DOCUMENTS 2905629  2/1981  Fed. Rep. of Germany .
4744296  6/1970  Japan .
2077542 12/1981  United Kingdom .

Primary Examiner—John Zazworsky
Attorney, Agent, or Firm—Finnegan, Henderson, Farabow, Garrett & Dunner

[57] ABSTRACT

A differential current distributing circuit includes a first current path including a first resistor, collector-emitter path of a first transistor of first conductivity type and emitter-collector path of second conductivity type which are connected in series between the output terminal of a constant current source and a first current output terminal and a second current path including a second resistor, collector-emitter path of a third transistor of first conductivity type and emitter-collector path of a fourth transistor of second conductivity type which are connected in series between the output terminal of the constant current source and a second current output terminal. The base electrode of the first transistor is connected to the output terminal of the second resistor and the base electrode of the third transistor is connected to the output terminal of the first resistor. A first input signal is supplied to the base electrode of the second transistor and a second input signal is supplied to the base electrode of the fourth transistor.

1 Claim, 6 Drawing Figures

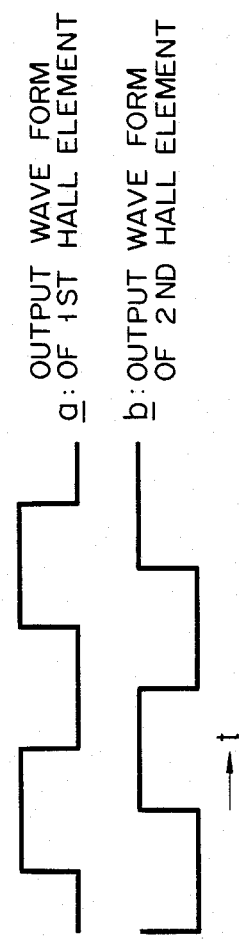
FIG. 3A CLOCK-WISE ROTATION OF ROTOR
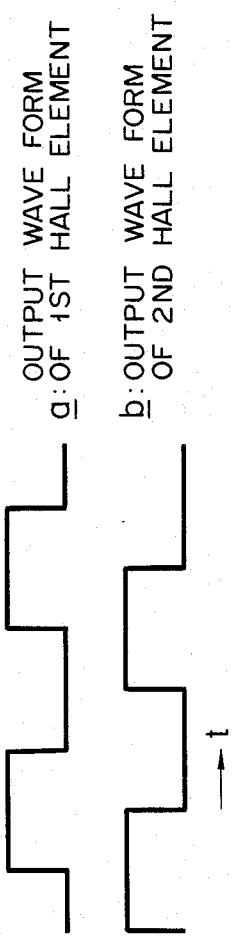
FIG. 3B COUNTER-CLOCK-WISE ROTATION OF ROTOR

DIFFERENTIAL CURRENT DISTRIBUTING CIRCUIT

BACKGROUND OF THE INVENTION

This invention relates to a differential current distributing circuit.

In a known hall motor, for example, at least one hall element is arranged around a rotor having an alternate array of N and S poles so as to detect the momentary position of the rotor. A drive current for driving the rotor is supplied to one of at least two driving coils disposed around the rotor by using the detection signal from the hall element, causing the rotor to be rotated in a predetermined direction. FIG. 1 shows a conventional differential current distributing circuit which can be used for this purpose. An emitter-collector path of a transistor TR1 of a predetermined conductivity type, for example, a PNP type is connected between an output terminal of a constant current source IE and a first current output terminal 1. A transistor TR2 of the same conductivity type as the transistor TR1 is connected between the output terminal of the constant current source IE and a second current output terminal 2. A signal IN1 on one output terminal of the hall element is coupled to the base electrode of the transistor TR1 and a signal IN2 on the other output terminal of the hall element is coupled to the base electrode of the transistor TR2. FIG. 2 shows the characteristic curve of the differential current distributing circuit as shown in FIG. 1. The abscissa in FIG. 2 denotes the polarity and level of the input signal IN1 with the input signal IN2 as a reference. A "0" point on the abscissa is a point where the level of the input signal IN1 is equal to that of the input signal IN2. The arrow 3 in FIG. 2 shows the direction in which the input signal IN1 is positive with respect to the input signal IN2 and the arrow 4 in FIG. 2 shows the direction in which the input signal IN1 is negative with respect to the input signal IN2. The ordinate in FIG. 2 shows the amplitude of the distributed current. In the graph as shown in FIG. 2, $I_1$ denotes a current value as obtained from the current output terminal 1 and $I_2$ a current value as obtained from the current output terminal 2. In FIG. 2, $I_{11}$ shows the value of the current $I_1$ when the input signal IN1 has a negative value corresponding to a line 0-5 with respect to the input signal IN2, and $I_{21}$ shows the value of the current $I_2$ under the same conditions. When the current distributing circuit as shown in FIG. 1, is used as the drive circuit for the hall motor, the current $I_1$ is supplied to one drive coil for the rotor and the current $I_2$ is supplied to the other drive coil for the motor. The polarities of the output signals of the hall element, i.e., the input signals IN1 and IN2 to the current distributing circuit vary according to the rotation of the rotor. It is desirable that the output current of the constant current source IE be completely and accurately distributed into one drive coil or the other drive coil in response to the point of time at which the polarity of the input signal IN1 or IN2 varies from positive to negative or from negative to positive. As evident from FIG. 2, the current $I_1$ and current $I_2$ vary along a hyperbolic tangential curve corresponding to the level of the input signal IN1 with the input signal IN2 as a reference. Therefore, it is difficult to completely distribute the current I from the constant current source IE into either of the current output terminals 1 and 2 in sharp response to the time at which the polarity of the input signal varies.

There is the case where it is desired to detect the rotational direction of the rotor by a means (not shown) and to control the driving of the hall motor by the detection signal from a hall element. In this case, a plurality of hall elements are arranged around the rotor. The respective hall element produces an output signal corresponding to the rotational position of the rotor. The hall elements can be arranged such that the cycles of the position signals from the respective hall elements have the same cycle, but that the phases of the position signals are different from each other.

The reason why the rotational direction of the rotor can be detected by arranging, for example, two hall elements around the rotor will be explained below by referring to FIGS. 3A and 3B. Now suppose that in FIG. 3A a denotes the output waveform of the first hall element, that b denotes the output waveform of the second hall element and that when the rotor is rotated in the clockwise direction the output waveform b is lagged by an angle $\theta$ with respect to the output waveform a. At the rise of the waveform a the polarity of the waveform a is opposite to that of the waveform b (FIG. 3A). When the rotor is rotated in the counterclockwise direction, the waveform b is leaded by the angle $\theta$ with respect to the waveform a and at the rise of the output waveform a the waveforms a and b have the same polarity. In other words, at the rise of the output waveform a of the first hall element the polarity of the output waveform a is different from that of the output waveform b of the second hall element if the rotational direction of the rotor is different. It is to be noted that a first differential current distributing circuit is connected to the output ends of the first hall element and that a second differential current distributing circuit is connected to the output ends of the second hall element. The rotation direction of the rotor is detected by the outputs of the two hall elements and, when the distribution of the current is to be effected in the first current distributing circuit, the value of the output current I of the constant current source IE in the first current distributing circuit is varied by the output of the second hall element according to the result of the detection.

In such a case, it is desired that the current distributing circuit have the following characteristic. That is, it is desired that, according to the polarity of that input signal IN1 with respect to the input signal IN2 which corresponds to the instant at which the current of the current source IE begins to flow, the output current of the current source IE be completely distributed into either of the first current path including the first current output terminal 1 and second current path including the second current output terminal 2, and that, even if the polarity of the input signal IN1 varies with respect to the input signal IN2, the distributed current path remain established during the time period in which the current of the current source IE maintains a predetermined level.

Since, however, the current values $I_1$ and $I_2$ obtained from the output current terminals 1 and 2 vary along the hyperbolic tangential curve, as shown in FIG. 2, according to the polarity and magnitude of the input signal IN1 with respect to the input signal IN2, it is impossible to obtain the above-mentioned desired characteristic from the current distributing circuit as shown in FIG. 1.

SUMMARY OF THE INVENTION

It is accordingly the object of this invention to provide a differential current distributing circuit in which the current of a constant current source can be completely distributed into one of first and second current paths in sharp response to a change in the polarity of an input signal and the current path so distributed remains established even if the polarity of the input signal varies.

According to this invention there is provided a differential current distributing circuit comprising a constant current source; a first current path including a first resistor, collector-emitter path of a first transistor of first conductivity type and emitter-collector path of a second transistor of second conductivity type which are connected in series between an output terminal of the constant current source and a first current output terminal; and a second current path including a second resistor, collector-emitter path of a third transistor of first conductivity type and emitter-collector path of a fourth transistor of second conductivity type which are connected in series between the output terminal of the constant current source and a second current output terminal; in which the base electrode of the first transistor is connected to the output terminal of the second resistor, the base electrode of the third transistor is connected to the output terminal of the first resistor, a first input signal is supplied to the base electrode of the second transistor, a second input signal is supplied to the base electrode of the fourth transistor, and an output current of the constant current source is distributed into either of the first and second current paths according to a level difference between the first and second input signals.

BRIEF DESCRIPTION OF THE DRAWINGS

FIGS. 3A and 3B show waveforms of the output signals of hall elements for explaining the detection of the rotational direction of a hall motor;

DETAILED DESCRIPTION OF THE PREFERRED EMBODIMENT

Figure 1:
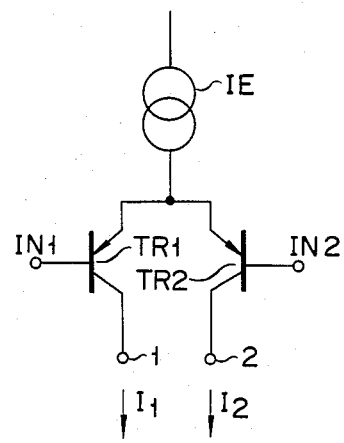
FIG. 1 is a circuit diagram showing a conventional differential current distributing circuit.
Figure 2:
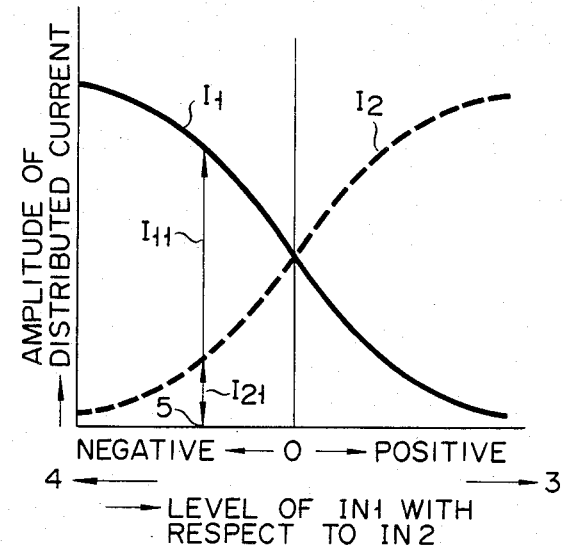
FIG. 2 is a characteristic curve showing the amplitude of the distributed current of the circuit as shown in FIG. 1.
Figure 4:
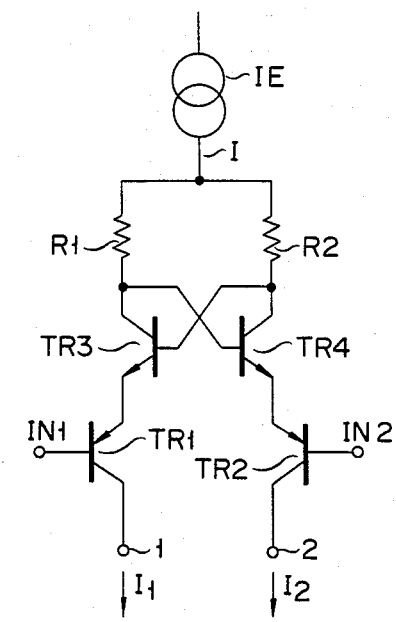
FIG. 4 is a circuit diagram showing a differential current distributing circuit of this invention.

In FIG. 4, the same reference numerals are employed to designate parts or elements corresponding to those as shown in FIG. 1. In FIG. 4, reference symbol I shows the output current of a constant current source IE. A first current path comprising a series circuit of a first resistor R1 having a predetermined resistive value, collector-emitter path of a first transistor TR3 of npn type and emitter-collector path of a second transistor TR1 of pnp type is connected between the constant current source IE and a first current output terminal 1. A second current path comprising a series circuit of a second resistor R2 having the same relative value as that of the resistor R1, collector-emitter path of a third transistor TR4 of npn type having the same characteristic as that of the transistor TR3 and emitter-collector path of a fourth transistor of a pnp type having the same characteristic as that of the transistor TR1 is connected between the output terminal of the constant current source IE and a second current output terminal 2. The base electrode of the first transistor TR3 is connected to the output terminal of the second resistor R2 and the base electrode of the third transistor TR4 is connected to the output terminal of the first resistor R1. A first input signal IN1 is supplied to the base electrode of the second transistor TR1 and a second input signal IN2 is supplied to the base electrode of the fourth transistor TR2.

Figure 5:
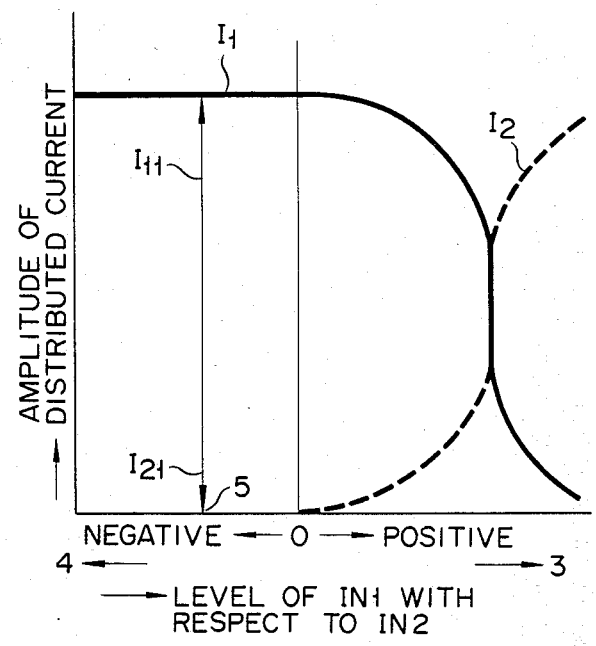
FIG. 5 is a characteristic curve showing the amplitude of the distributed current of the circuit of FIG. 4.

The operation of the differential current distributing circuit of FIG. 4 will be explained below by referring to FIG. 5. Now suppose that a signal on one terminal of an output circuit of a hall element arranged around the rotor of a hall motor is supplied as a first input signal IN1 and a signal on the other terminal of the output circuit is supplied as a second input signal IN2. When the output current I from the constant current source IE begins to increase from a small value which is substantially zero, the current of the small value flows through a third current path comprising the first resistor R1, base-emitter path of the third transistor TR4 and emitter-collector path of the fourth transistor TR2, and through a fourth current path comprising the second resistor R2, base-emitter path of the first transistor TR3 and emitter-collector path of the second transistor TR1. In this case, more current flows through either of the third or the fourth current path depending upon which of the input signals IN1 or IN2 has a lower voltage level. When, for example, the input signal IN1 has a lower voltage level than that of the input signal IN2, more current flows through the fourth current path than through the third current path. The current through the fourth current path is supplied to the base of the first transistor TR3, causing a resistive value of the collector-emitter path of the first transistor TR3 to be lowered and the collector current of the transistor TR3 to be increased. Then, the base current of the third transistor TR4 is decreased due to a voltage drop across the first resistor R1. In this way, the base current of the transistor TR4 is gradually further decreased, cutting off the third and fourth transistors TR4 and TR2. Even if the level of the first input signal IN1 becomes greater than that of the input signal IN2 during the cut-off period of the transistors TR4 and TR2, the above-mentioned current distribution is maintained so long as the input voltage to the base electrode of the transistor TR4 is smaller than a predetermined voltage level. The predetermined input voltage level means an input voltage to the base electrode of the transistor TR4 when the collector current of the transistor TR3 is decreased, the voltage across the first resistor R1 drops down to 0.6 V and the cut-off of the transistor TR4 is released. When the level of the input signal IN2 is lower than that of the input signal IN1, more current flows through the third current path than the fourth current path. As a result, the output current I of the constant current source IE is distributed into the second current path as indicated by I2 in FIG. 4. That is, the transistors TR3 and TR1 are cut-off and the output current I of the constant current source IE is distributed into the second current path. Even if the level of the input signal IN2 becomes higher than that of the input signal IN1, the current I2 remains distributed through the second current path until the voltage across the second resistor R2 drops down to 0.6 V to cause the cut-off of the transistor TR3 to be released.

As mentioned above, the current I from the constant current source IE is completely distributed into either of the first and the second current path according to a level difference between the input signals IN1 and IN2 which corresponds to the instant at which the output current I of the constant current source IE begins to increase from a substantially zero level. Further, the differential current distributing circuit according to this invention, even if the polarities of the input signals IN1 and IN2 vary, the current path through which the current is once distributed remains established so long as the current so distributed is maintained at a predetermined level.

The application of the differential current distributing circuit as shown in FIG. 4 is not limited to a drive circuit for a hall motor.

What is claimed is:

1. A differential current distributing circuit comprising:
   a constant current source;
   a first current path including a first resistor, collector-emitter path of a first transistor of first conductivity type and emitter-collector path of a second transistor of second conductivity type which are connected in series between an output terminal of the constant current source and a first current output terminal; and
   a second current path including a second resistor, a collector-emitter path of a third transistor of first conductivity type and emitter-collector path of a fourth transistor of second conductivity type which are connected in series between the output terminal of said constant current source and a second current output terminal,
   in which the base electrode of said first transistor is connected to the output terminal of said second resistor, the base electrode of said third transistor is connected to the output terminal of said first resistor, a first input signal is supplied to the base electrode of said second transistor, a second input signal is supplied to the base electrode of said fourth transistor, and an output current of said constant current source is distributed into either of said first and second current paths according to a level difference between said first and second input signals.

* * * * *